US012644499B2

(12) United States Patent
Dubois et al.

(10) Patent No.: US 12,644,499 B2
(45) Date of Patent: Jun. 2, 2026

(54) TORSION DAMPER AND CLUTCH DISC

(71) Applicant: VALEO EMBRAYAGES, Amiens Cedex (FR)

(72) Inventors: Bernard Dubois, Amiens Cedex (FR); Jerome Boudin, Amiens Cedex (FR); Paul Farineaux, Amiens Cedex (FR)

(73) Assignee: VALEO EMBRAYAGES, Amiens Cedex (FR)

( * ) Notice: Subject to any disclaimer, the term of this patent is extended or adjusted under 35 U.S.C. 154(b) by 0 days.

(21) Appl. No.: 18/999,574

(22) Filed: Dec. 23, 2024

(65) Prior Publication Data

US 2025/0215955 A1 Jul. 3, 2025

(30) Foreign Application Priority Data

Dec. 31, 2023 (FR) ...................................... 2315554

(51) Int. Cl.
*F16F 15/129* (2006.01)
*F16D 3/12* (2006.01)

(52) U.S. Cl.
CPC .............. *F16F 15/129* (2013.01); *F16D 3/12* (2013.01); *F16D 2300/22* (2013.01)

(58) Field of Classification Search
CPC .............................. F16F 15/121; F16F 15/129
See application file for complete search history.

(56) References Cited

U.S. PATENT DOCUMENTS

| | | | | |
|---|---|---|---|---|
| 4,573,945 A | * | 3/1986 | Kajitani | ............ F16F 15/12366 |
| | | | | 464/68.41 |
| 2016/0032982 A1 | * | 2/2016 | Lu | ............................ B21J 15/00 |
| | | | | 29/524.1 |

(Continued)

FOREIGN PATENT DOCUMENTS

| | | | |
|---|---|---|---|
| DE | 299 24 341 U1 | 10/2002 | |
| DE | 10 2020 202 324 A1 | 10/2020 | |
| WO | WO-2005026575 A1 * | 3/2005 | ............ F16F 15/121 |

OTHER PUBLICATIONS

Machine translation of WO2005026575A1 (Year: 2025).*

(Continued)

*Primary Examiner* — Stacey A Fluhart
(74) *Attorney, Agent, or Firm* — Oblon, McClelland, Maier & Neustadt, L.L.P.

(57) ABSTRACT

A torsion damper for a vehicle powertrain includes a first element rotatable about an axis, a second element rotatable with respect to the first element about the axis. The second element includes first and second axially spaced lateral washers mounted coupled in rotation. The first element includes an intermediate disc arranged axially between the lateral washers. Springs are mounted between the first and second element to allow relative rotation between the first and second element. A first friction device includes a first friction washer arranged between the first lateral washer and first element, and a first elastic washer arranged axially between the first element and the first friction washer. A second friction device includes a second friction washer arranged between the second lateral washer and the first element, and a second elastic washer arranged axially between the first element and the second friction washer.

20 Claims, 4 Drawing Sheets

(56) References Cited

U.S. PATENT DOCUMENTS

2022/0065305 A1\*    3/2022    Bagard  ............. F16F 15/12333
2022/0178421 A1\*    6/2022    Bouche  .............. F16F 15/1292

OTHER PUBLICATIONS

Preliminary French Search Report issued Nov. 15, 2024 in French
Application 2315554 filed on Dec. 31, 2023, 9 pages (with English
Translation of Categories of Cited Documents & Written Opinion).

\* cited by examiner

[Fig. 1]
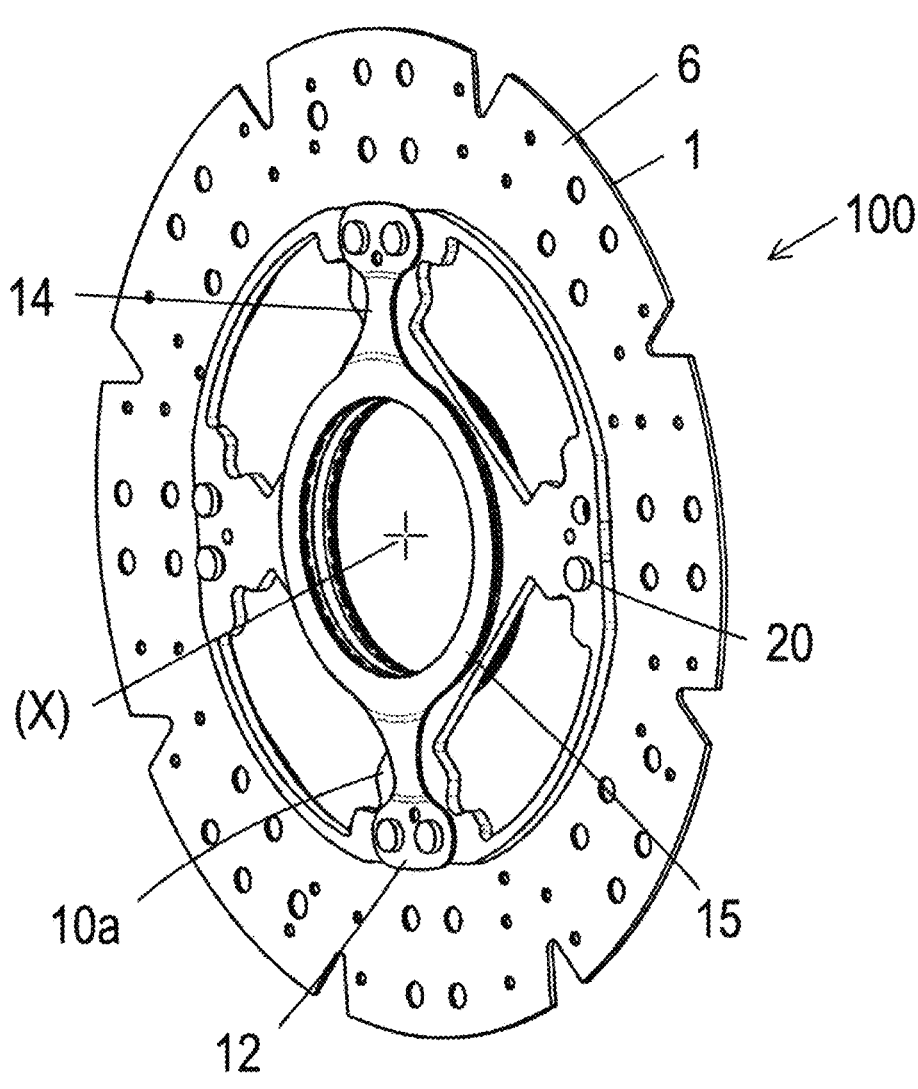

[Fig. 2]
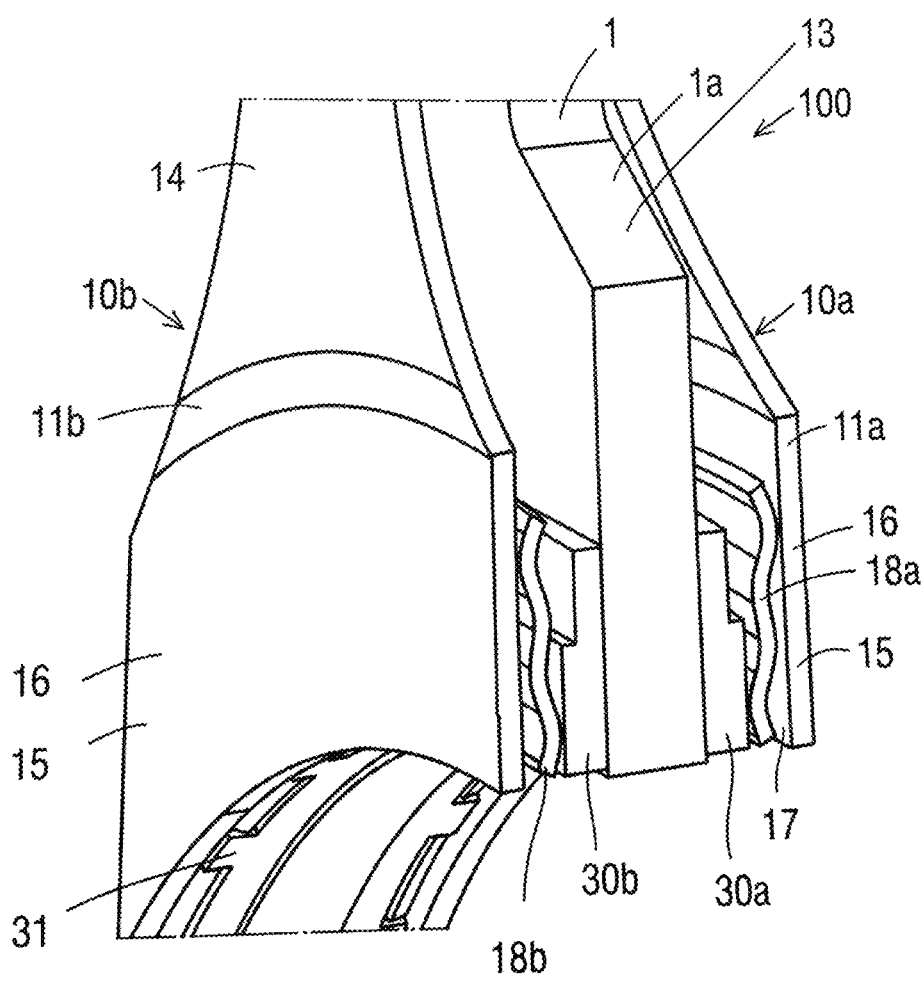

[Fig. 3]
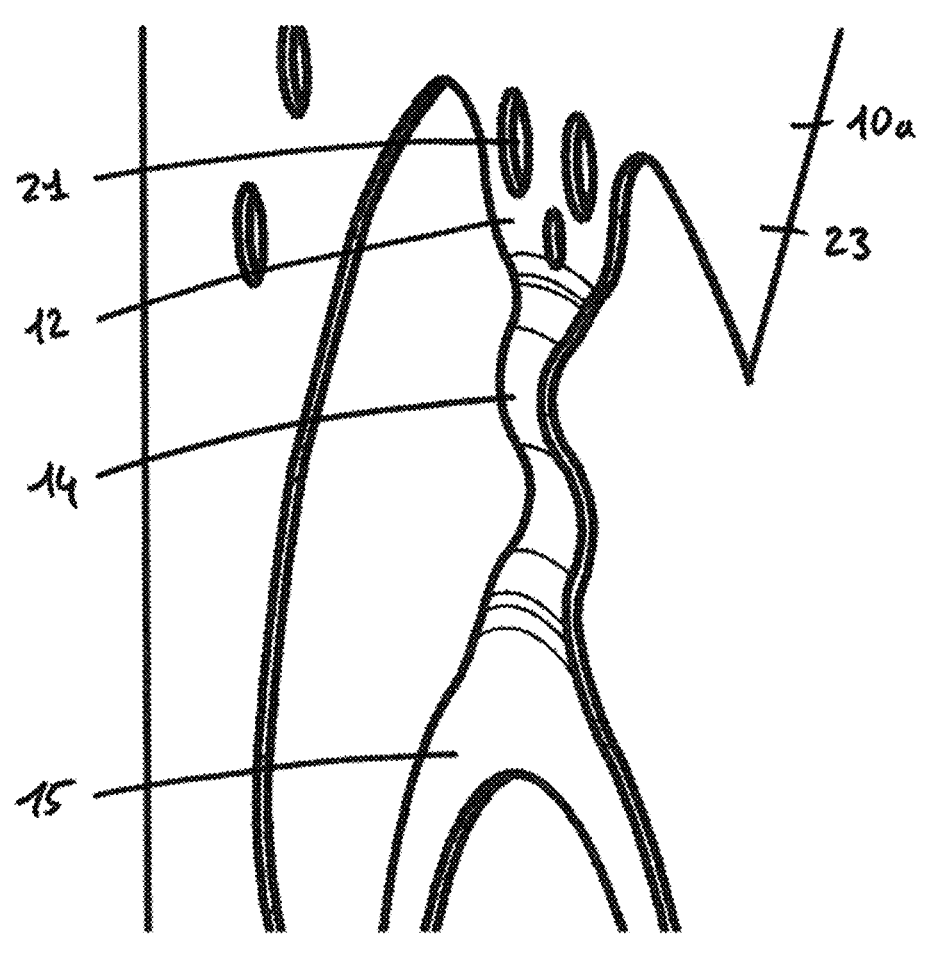

[Fig. 4]
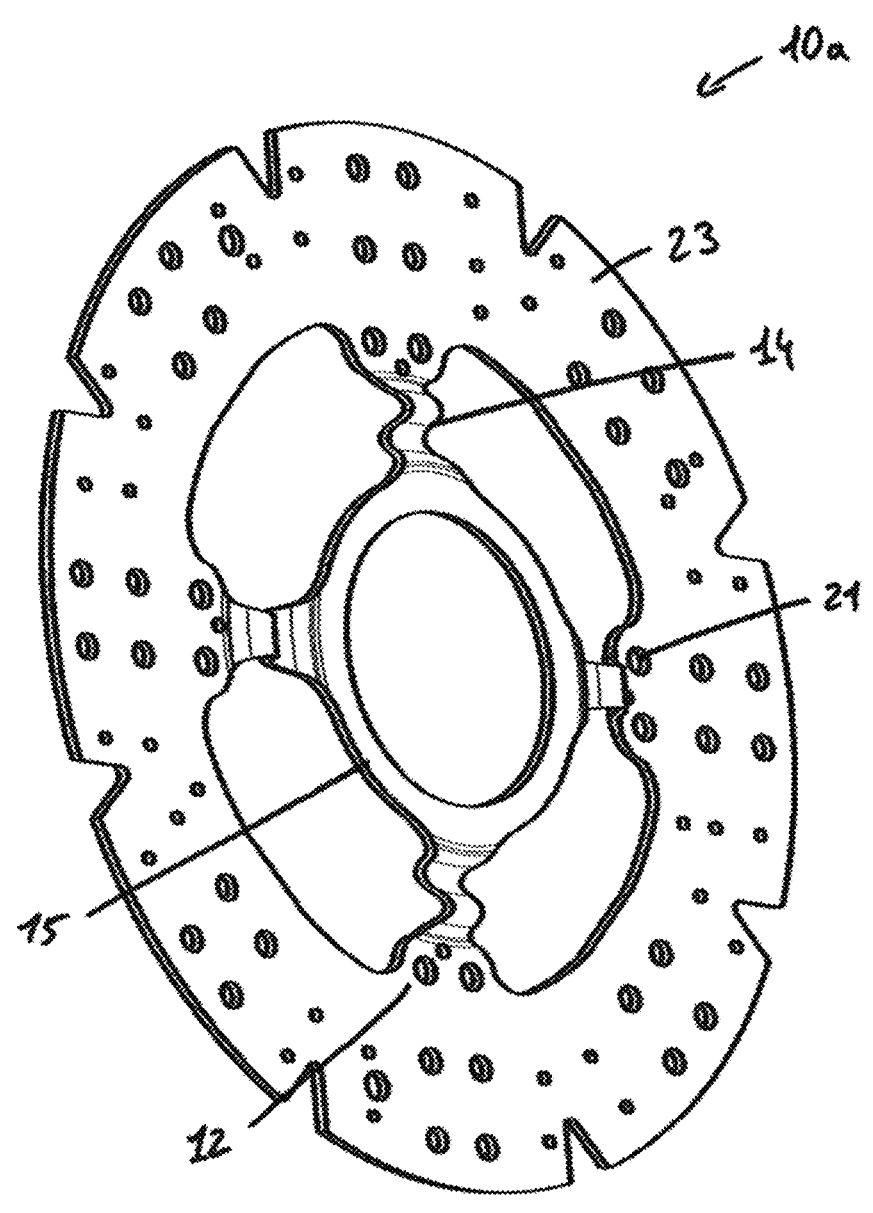

TORSION DAMPER AND CLUTCH DISC

The invention relates to a torsion damper for a vehicle powertrain. More precisely, the invention is intended for clutch discs of vehicles, for example for trucks.

PRIOR ART

A clutch disc conventionally comprises a friction disc with an axis X of rotation, provided with friction linings, a hub configured to drive a gearbox input shaft to rotate about this axis X, and a torsion damper kinematically arranged between the friction disc and the hub. A torsion damper conventionally comprises springs interposed between a first element and a second element of the damper in order to compress, allowing relative rotation between the first element and the second element about the axis X of rotation, and a friction device configured to dissipate by friction the energy stored in the springs.

To do this, the friction devices used in the clutch discs generally comprise friction washers which are locked in rotation on the first element of the damper by means of coupling elements such as teeth or splines, or folded tabs that are inserted into complementary slots in the first element.

Such friction devices have the advantage of allowing axial movement of the friction washer along the axis X as the friction parts become thinner on account of wear.

Nevertheless, in order to allow axial movement of the friction washer with respect to the first element, the aforementioned coupling elements (teeth, splines, tabs) must cooperate with a minimum angular clearance. In the absence of angular clearance, axial movement of the friction washer would be difficult or even impossible owing to axial friction between the teeth/splines.

The presence of an angular clearance means that the friction washer and the first element are not strictly coupled in rotation to each other, especially since impact-induced plastic deformation phenomena between these coupling elements tend to amplify the initial angular clearance as the friction device operates. Specifically, vibrations passing through the damper generate impacts between the aforementioned coupling elements and the support component. The level of impact is such that it is possible to plastically deform or shear these coupling elements.

This can lead to premature wear and reduced performance of the friction device.

SUMMARY OF THE INVENTION

The damper according to the invention aims to solve the technical problems posed by the prior art by definitively eliminating the problems of plastic deformation while proposing a solution at a reduced cost.

This object is achieved, according to the invention, by means of a torsion damper intended to equip a vehicle powertrain, the damper comprising:

a first element rotatable about an axis X of rotation, a second element rotatable with respect to the first element about the axis X of rotation, the second element comprising a first lateral washer and a second lateral washer that are mounted coupled in rotation about the axis and axially spaced from each other, and the first element comprising an intermediate disc arranged axially between the first and second lateral washer, springs mounted between the first element and the second element so as to compress to allow relative rotation, about the axis X, between the first element and the second element, a first friction device comprising a first friction washer provided with at least one fixing portion fixed in a rotationally rigid manner to the first element or to the second element, the first friction washer having a friction portion arranged between the first lateral washer and the first element; and a first elastic washer arranged axially between the first element and the friction portion of the first friction washer, a second friction device comprising a second friction washer provided with at least one fixing portion fixed in a rotationally rigid manner to the first element or to the second element, the second friction washer having a friction portion arranged between the second lateral washer and the first element; and a second elastic washer arranged axially between the first element and the friction portion of the second friction washer.

Thus, it is possible to prevent rotation between the first or the second element and the two friction washers, without angular clearance, while allowing movement of the friction portion with respect to said first or second element, thereby making it possible to compensate for wear on the friction surfaces and eliminating the problems of plastic deformation. In addition, the placement of a friction device on either side of the first element makes it possible to obtain a more flexible system, the two elastic washers being independently subjected to the axial pulsations passing through the damper. The service life of the damper according to the invention is thus increased.

The damper may include one or more of the following features:

The first friction washer and the second friction washer are identical and positioned symmetrically with respect to the first element. Thus, the damper is simple and inexpensive to produce because of the standardization of the parts.

The first elastic washer and the second elastic washer are identical and positioned symmetrically with respect to the first element. Thus, the damper is simple and inexpensive to produce because of the standardization of the parts.

The first friction device further comprises a first shim washer arranged axially between the first element and the first elastic washer. Thus, the first elastic washer is positioned optimally and retains its position over time. In addition, it makes it possible to optimize the load characterization of the first elastic washer.

The second friction device further comprises a second shim washer arranged axially between the first element and the second elastic washer, the first shim washer and the second shim washer being identical and positioned symmetrically with respect to the first element. Thus, the second elastic washer is positioned optimally and retains its position over time. In addition, the damper is simple and inexpensive to produce because of the standardization of the parts.

The first friction washer comprises only two fixing portions, each fixing portion being connected to the friction portion by a flexible element. Thus, the presence of only two fixing portions allows the first friction washer to have almost zero stiffness. In addition, the first friction washer is simple and inexpensive to produce.

Each fixing portion is connected to the friction portion by a single flexible element. Thus, the first friction washer is simple and inexpensive to produce.

The second friction washer comprises only two fixing portions, each fixing portion being connected to the friction portion by a flexible element. Thus, the presence of only two fixing portions allows the second friction washer to have almost zero stiffness. In addition, the second friction washer is simple and inexpensive to produce.

Each fixing portion is connected to the friction portion by a single flexible element. Thus, the second friction washer is simple and inexpensive to produce.

The flexible element is a flexible tab.

The two fixing portions are arranged at 180 degrees from each other. Thus, the first and/or second friction washer are/is simple and inexpensive to produce.

The two fixing portions are arranged between 50 and 110 degrees from each other. The two fixing portions are preferably arranged at 90 degrees from each other. Thus, the first and/or the second friction washer can adapt to various ergonomic constraints of the damper while maintaining almost zero stiffness.

The first friction washer comprises at least three fixing portions, each fixing portion being connected to the friction portion by a flexible element comprising at least one corrugated part having, radially, a succession of regions axially offset in pairs. Thus, the first friction washer is more robust while having almost zero stiffness.

The second friction washer comprises at least three fixing portions, each fixing portion being connected to the friction portion by a flexible element comprising at least one corrugated part having, radially, a succession of regions axially offset in pairs. Thus, the second friction washer is more robust while having almost zero stiffness.

Each fixing portion is connected to the friction portion by a single flexible element. Thus, the first and/or second friction washer are/is simple and inexpensive to produce.

The first element comprises an annular member such as a disc or a washer whose centre is arranged on the axis X of rotation.

Each fixing portion of the friction washer is fixed to the first element or to the second element via a support element.

The torsion damper is capable of transmitting torque from the engine of the vehicle to the driving wheels of the vehicle.

According to one embodiment, the first element is intended to be driven to rotate by the engine of the vehicle, and the second element is intended to drive a gearbox input member of the vehicle, such as a shaft, to rotate.

According to a variant, the second element is intended to be driven to rotate by the engine of the vehicle, and the first element is intended to drive a gearbox input member of the vehicle, such as a shaft, to rotate.

The first elastic washer is arranged axially between first element and the friction portion of the first friction washer, in order to press the friction portion of the first friction washer axially against a friction surface of the second element.

Each fixing portion is axially locked on the first or the second element.

Each fixing portion is mounted coupled in rotation with the first or the second element, without angular clearance.

In particular, the mounting of the fixing portions is not removable so as to avoid angular mounting clearances. In other words, the fixing portions are fixed in a non-removable manner to the first or second element.

The fixing portion is connected to the first or second element by an embedded connection such as a riveted or welded connection. The term "embedded connection" is understood to mean a connection with no degree of freedom.

Each first or second element and each fixing portion each comprise at least one opening, each fixing portion opening being arranged opposite an opening in the first or second element, and each fixing portion is fixed in a rotationally rigid manner to the corresponding first or second element by means of at least one fixing element, such as a rivet or a pin.

Each fixing portion is also axially locked on the first or second element by virtue of the fixing element.

In particular, the fixing element may be a rivet comprising a shank intended to be engaged in the openings in the fixing portion and in the first or second element, and further comprising at each end a head widened with respect to the shank.

The fixing portions are arranged radially outside the springs.

The springs are helical springs that extend circumferentially or tangentially about the axis X over a mean installation radius, and the fixing portions are arranged radially outside the mean installation radius.

The mean installation radius is taken at the mid-region of the length of a spring, and at the main axis around which the turns are wound.

Each flexible element is elastically deformable axially.

The load exerted by the first elastic washer is greater than the load exerted by the flexible element(s) of the first friction washer.

Each flexible element has a linear axial stiffness.

Each flexible element is arranged circumferentially between two springs.

The first element comprises apertures for housing the springs and a support element arranged circumferentially between two adjacent apertures. Each flexible element is rigidly secured to a support element of the first element.

The friction portion is composed of a plurality of friction pads spaced apart from one another.

The friction portion is composed of a single circular friction pad.

Each fixing portion is arranged to receive one or two rivets.

Each fixing portion is arranged circumferentially between two adjacent springs.

According to one embodiment, the first friction washer is cut out of a metal sheet.

According to one embodiment, the first friction washer is flat before it is mounted in the torsion damper.

Where appropriate, the deformation of the first friction washer during its mounting makes it possible to generate the axial load of the flexible elements, in particular in a direction opposite to the direction of the forces exerted by the first elastic washer.

The second element comprises a first and a second lateral washer mounted coupled in rotation about the axis X and spaced axially from each other; and the first element comprises an intermediate disc arranged axially between the two lateral washers.

The invention also relates to a clutch disc for a vehicle powertrain equipped with a damper as described above and with a friction disc carried by the first element and provided with friction linings.

A hub is coupled in rotation with the first and the second lateral washer. In other words, the second element comprises this hub.

The hub is provided with a collar on either side of which the first and the second lateral washer come into axial abutment.

The hub and the first and second lateral washers are riveted together.

According to a first variant, in particular without a predamper, the hub is an output hub capable of driving a gearbox input shaft.

According to a second variant, the hub is an intermediate hub coupled with an angular clearance to an output hub, and the clutch disc further comprises a pre-damper provided with pre-damping springs arranged kinematically between the output hub and the second element.

The clutch disc comprises an output hub driven to rotate directly or indirectly (via a pre-damper for example) by the first element.

The friction disc and the first friction washer are fixed to the first element with the same fixing elements, for example the same rivets.

The friction disc, the first element (in particular the central disc), the first friction device and the second friction device together form a preassembled subassembly capable of being inserted between the first and second lateral washers.

This subassembly is mounted without axial locking on the hub.

BRIEF DESCRIPTION OF THE FIGURES

Other features and advantages of the invention will emerge from reading the description which follows, with reference to the appended figures detailed below.

FIG. 1 is a partial perspective view of a clutch disc according to the invention comprising a first friction washer according to a first embodiment.

FIG. 2 is a partial sectional view of the torsion damper of the clutch disc of FIG. 1.

FIG. 3 is a profile view of the first friction washer according to a second embodiment.

FIG. 4 is a close-up of FIG. 3.

For more clarity, identical or similar elements are identified by identical reference signs in all of the figures.

DETAILED DESCRIPTION OF EMBODIMENTS

Of course, the embodiments illustrated by the figures presented above are given only by way of non-limiting examples.

In the description and the claims, the terms "outer" and "inner" as well as the "axial" and "radial" orientations are used to designate, according to the definitions given in the description, elements of the damper. By convention, the "radial" orientation is directed orthogonally to the axis of rotation X of the damper determining the "axial" orientation and, from the inside to the outside moving away from said axis of rotation, the "circumferential" orientation is circular about the axis X, and the tangential orientation is directed orthogonally to the axis of rotation of the damper and orthogonally to the radial direction. The terms "outer" and "inner" are used to define the relative position of one element with respect to another, with reference to the axis X of rotation of the damper, an element close to the axis thus being qualified as inner as opposed to an outer element located radially at the periphery.

FIG. 1 shows a perspective view of a clutch disc for a vehicle powertrain. The clutch disc is equipped with a damper 100 and with a friction disc 6 provided with friction linings.

The torsion damper 100 comprises a first element 1 capable of rotating about an axis X of rotation, and a second element rotatable with respect to the first element 1 about the axis X. This torsion damper 100 is capable of transmitting torque from the engine of the vehicle to the driving wheels of the vehicle.

Springs may be mounted between the first element 1 and the second element, so as to compress to allow relative rotation, about the axis X, between the first element 1 and the second element.

The second element may comprise a first lateral washer and a second lateral washer that are mounted coupled in rotation about the axis X and spaced axially from each other. The first element 1 may comprise an intermediate disc 1a arranged axially between the two lateral washers.

The friction disc 6 may be carried by the intermediate disc 1a at its outer periphery.

The clutch disc may further comprise an output hub driven to rotate indirectly, via a pre-damper, by the second element, via the first lateral washer. The output hub may be coupled with angular clearance to the second element. The pre-damper may be provided with pre-damping springs kinematically arranged between the output hub and the second element.

The output hub may comprise a collar on either side of which the first lateral washer and the second lateral washer come into axial abutment.

The intermediate disc 1a may comprise a support element 13. Alternatively, the first lateral washer and the second lateral washer may comprise a support element 13.

The damper 100 may comprise a first friction device 10a comprising a first friction washer 11a. The first friction washer 11a may be provided with two single fixing portions 12 fixed rigidly in rotation to the first element 1 or the second element. More particularly, each of the two fixing portions 12 may be fixed to the support element 13 of the intermediate disc 1a. Alternatively, each of the two fixing portions 12 may be fixed to the support element 13 of the first lateral washer or the second lateral washer.

The first friction washer 11a has a friction portion 15. The friction portion 15 may have a friction track 16 and a dorsal face 17.

Each of the two fixing portions 12 of the first friction washer 11a may be connected to the friction portion 15 by a flexible element 14 allowing axial movement of the dorsal face 17 with respect to the first element 1. Thus, it is possible to prevent rotation between the first element and the first friction washer 11a, without angular clearance, while allowing movement of the dorsal face 17 of the friction portion 15 with respect to the first element 1, thereby making it possible to compensate for wear on the friction surfaces.

The flexible element 14 may be a flexible tab. It may be formed integrally with the friction portion 15 and the fixing portion 12. Thus, the first friction washer 11a is advantageously manufactured from a single metal sheet.

Each support element 13 and each fixing portion 12 may each comprise at least one opening 21. Each fixing portion opening 12 is arranged opposite a support element opening 13.

Each fixing portion 12 may thus be fixed in a rotationally rigid manner to the corresponding support element 13 by means of at least one fixing element, such as a rivet 20.

Each fixing portion 12 is also locked axially on the support element 13 by means of the rivets 20.

The friction portion 15 is formed on a radially inner part of the first friction washer 11a, and each fixing portion 12 is formed on a radially outer part of the first friction washer 11a.

As can be seen in the figures, the clutch disc may further comprise springs. The springs may be helical springs that extend circumferentially or tangentially around the axis X over a mean installation radius. The fixing portions 12 are arranged radially outside the mean installation radius. The mean installation radius is taken at the mid-region of the length of a spring, and at the main axis around which the turns of the spring are wound.

The first friction washer 11a may comprise two single fixing portions 12, and the first element 1 or the second element may comprise a plurality of support elements 13, part of the support elements 13 receiving a fixing portion 12.

Each flexible tab 14 is elastically deformable axially.

The first friction device 10a may further comprise a first elastic washer 18a. The first elastic washer 18a may be arranged axially between the first element 1 and the first friction washer 11a.

More particularly, the first elastic washer 18a may be arranged axially between the intermediate disc 1a and the dorsal face 17 of the friction portion 15.

As illustrated in FIG. 2, the first elastic washer 18a is arranged axially between the intermediate disc 1a and the dorsal face 17 of the friction portion 15 of the first friction washer 11a, in order to press the friction portion 15 axially against a friction surface of the first lateral washer.

The first elastic washer 18a may be in one piece. The first elastic washer 18a may be continuous and extend circumferentially. The first elastic washer 18a may have a corrugated shape. The corrugated shape has, radially, a succession of regions axially offset in pairs.

The first friction device 10a may further comprise a first shim washer 30a. The first shim washer 30a may comprise a continuous and circumferentially extending main body. The first shim washer 30a may comprise a plurality of tabs 31 extending axially from the main body. The plurality of tabs 31 may be adapted to hold the first elastic washer 18a.

The first shim washer 30a may be arranged axially between the first element 1 and the first friction washer 11a. More particularly, the first shim washer 30a may be arranged axially between the first element 1 and the first elastic washer 18a.

Each flexible tab 14, the first elastic washer 18a and the first shim washer 30a may be configured so that, in operation, for at least one state of compression of the first elastic washer 18a, an axial load is exerted by each flexible tab 14 in a direction opposite to the direction of the load exerted by the first elastic washer 18a on the friction portion 15.

The flexible tabs 14 and the first elastic washer 18a may be configured so that the load exerted by the first elastic washer 18a remains greater than the load exerted by the flexible tabs 14 of the first friction washer 11a.

In general, the state of compression of the first elastic washer 18a may depend on the initial preload of the first elastic washer 18a and on the state of wear of the first friction device 10a.

The two single fixing portions 12 may be arranged at 180 degrees from each other. Alternatively, the two single fixing portions may be arranged between 50 and 110 degrees from each other, preferably at 90 degrees from each other.

FIG. 1 shows that each flexible tab 14 may be arranged circumferentially between two springs. The first element 1 may comprise apertures for housing the springs, and each support element 13 is arranged circumferentially between two adjacent apertures.

The friction portion 15 may be composed of a single friction plate. The friction plate may extend circularly around the axis X. The friction plate may be continuous. Alternatively, the friction portion 15 may be composed of a plurality of friction pads spaced apart from one another. Each friction pad 15 may be associated with a single flexible tab 14.

The friction portion 15 forms a radially inner ring of the first friction washer 11a that extends around the axis X of rotation and develops radially.

The first friction washer 11a may further comprise a radially outer ring 23, and each flexible tab 14 connects the friction portion 15 and the radially outer ring 23. The radially outer ring 23 extends around the axis X of rotation and develops radially.

The fixing portions 12, the flexible tabs 14, the friction portion 15 and the radially outer ring 23 may be formed as a single piece from a cut-out metal sheet.

A space may be present between two adjacent flexible tabs 14, in particular to allow the arrangement of a spring. In other words, the flexible tabs 14 are each arranged between two springs. The radially outer ring 23 is arranged against a radially outer edge of the first element 1.

Each fixing portion 12 may be formed on a flare that extends the flexible tab 14 and that connects the flexible tab 14 to the radially outer ring 23. Each fixing portion 12 may be designed to receive two rivets 20.

According to a second embodiment of the first friction washer 11a, shown in FIGS. 3 and 4, the first friction washer may comprise a plurality of fixing portions 12. The plurality is at least three fixing portions 12. Each flexible tab 14 connecting the fixing portions 12 to the friction portion 15 may be corrugated. Each corrugated flexible tab 14 may have, radially, a succession of regions axially offset in pairs.

The damper may comprise an even number n of springs, for example four springs, interposed circumferentially between the intermediate disc 1a and the second element. The first friction washer 11a may comprise n fixing portions 12, for example four fixing portions, and n flexible elements, for example four flexible elements. Thus, it is possible to have a first friction washer 11a with less axial stiffness. Each fixing portion 12 may be arranged circumferentially between two adjacent springs.

The damper 100 may further comprise a second friction device 10b. The second friction device 10b may be independent of the first friction device 10a. The second friction device 10b is designed to be subjected, independently of the first friction device 10a, to the axial pulsations associated with the passage of the engine torque. The second friction device 10b comprises a second friction washer 11b. The second friction washer 11b may be identical to the first friction washer 11a. The first friction washer 11a and the second friction washer 11b may be positioned with mutual central symmetry with respect to the first element 1.

The second friction device 10b may further comprise a second elastic washer 18b. The second elastic washer 18b may be identical to the first elastic washer 18a. The first elastic washer 18a and the second elastic washer 18b may be positioned with mutual central symmetry with respect to the first element 1. The second elastic washer 18b makes it possible to press the second friction washer 11b axially independently with respect to the first friction washer 11a.

The second friction device 10b may further comprise a second shim washer 30b. The second shim washer 30b may be identical to the first shim washer 30a. The first shim washer 30a and the second shim washer 30b may be positioned with mutual central symmetry with respect to the first element 1.

The presence of the two independent friction devices 10a and 10b, which are identical to each other and positioned with axial symmetry with respect to the first element 1, makes it possible to definitively eliminate the problems of plastic deformation, thus increasing the service life of the damper 100.

The invention claimed is:

1. Torsion damper, which is intended to equip a vehicle powertrain, the damper comprising:

a first element rotatable about an axis of rotation, a second element rotatable with respect to the first element about the axis of rotation, the second element comprising a first lateral washer and a second lateral washer that are mounted coupled in rotation about the axis and spaced axially from each other, and the first element comprising an intermediate disc arranged axially between the first and second lateral washer, springs mounted between the first element and the second element so as to compress to allow relative rotation, about the axis, between the first element and the second element, a first friction device comprising a first friction washer provided with at least one fixing portion fixed in a rotationally rigid manner to the first element or to the second element, the first friction washer having a friction portion arranged between the first lateral washer and the first element; and a first elastic washer arranged axially between the first element and the friction portion of the first friction washer, a second friction device comprising a second friction washer provided with at least one fixing portion fixed in a rotationally rigid manner to the first element or to the second element, the second friction washer having a friction portion arranged between the second lateral washer and the first element; and a second elastic washer arranged axially between the first element and the friction portion of the second friction washer.

2. Torsion damper according to claim 1, wherein the first friction washer and the second friction washer are identical and positioned symmetrically with respect to the first element.

3. Torsion damper according to claim 2, wherein the first elastic washer and the second elastic washer are identical and positioned symmetrically with respect to the first element.

4. Torsion damper according to claim 2, wherein the first friction device further comprises a first shim washer arranged axially between the first element and the first elastic washer.

5. Torsion damper according to claim 2, wherein the first friction washer comprises only two fixing portions, each fixing portion being connected to the friction portion by a flexible element.

6. Torsion damper according to claim 2, wherein the first friction washer comprises at least three fixing portions, each fixing portion being connected to the friction portion by a flexible element comprising at least one corrugated part having, radially, a succession of regions axially offset in pairs.

7. Torsion damper according to claim 2, wherein each fixing portion is connected to the friction portion by a flexible element allowing axial movement of the friction portion with respect to the support element of the first element.

8. Clutch disc for a vehicle powertrain equipped with a damper according to claim 2 and with a friction disc carried by the first element and provided with friction linings.

9. Torsion damper according to claim 1, wherein the first elastic washer and the second elastic washer are identical and positioned symmetrically with respect to the first element.

10. Torsion damper according to claim 9, wherein the first friction device further comprises a first shim washer arranged axially between the first element and the first elastic washer.

11. Torsion damper according to claim 9, wherein the first friction washer comprises only two fixing portions, each fixing portion being connected to the friction portion by a flexible element.

12. Torsion damper according to claim 9, wherein the first friction washer comprises at least three fixing portions, each fixing portion being connected to the friction portion by a flexible element comprising at least one corrugated part having, radially, a succession of regions axially offset in pairs.

13. Torsion damper according to claim 1, wherein the first friction device further comprises a first shim washer arranged axially between the first element and the first elastic washer.

14. Torsion damper according to claim 13, wherein the second friction device further comprises a second shim washer arranged axially between the first element and the second elastic washer, the first shim washer and the second shim washer being identical and positioned symmetrically with respect to the first element.

15. Torsion damper according to claim 1, wherein the first friction washer comprises only two fixing portions, each fixing portion being connected to the friction portion by a flexible element.

16. Torsion damper according to claim 15, wherein the two fixing portions are arranged at 180 degrees from each other.

17. Torsion damper according to claim 15, wherein the two fixing portions are arranged between 50 and 110 degrees from each other.

18. Torsion damper according to claim 1, wherein the first friction washer comprises at least three fixing portions, each fixing portion being connected to the friction portion by a flexible element comprising at least one corrugated part having, radially, a succession of regions axially offset in pairs.

19. Torsion damper according to claim 1, wherein each fixing portion is connected to the friction portion by a flexible element allowing axial movement of the friction portion with respect to the support element of the first element.

20. Clutch disc for a vehicle powertrain equipped with a damper according to claim 1 and with a friction disc carried by the first element and provided with friction linings.

* * * * *